June 13, 1939.  C. M. EASON  2,162,071
CLUTCH
Filed Jan. 15, 1937  3 Sheets-Sheet 3
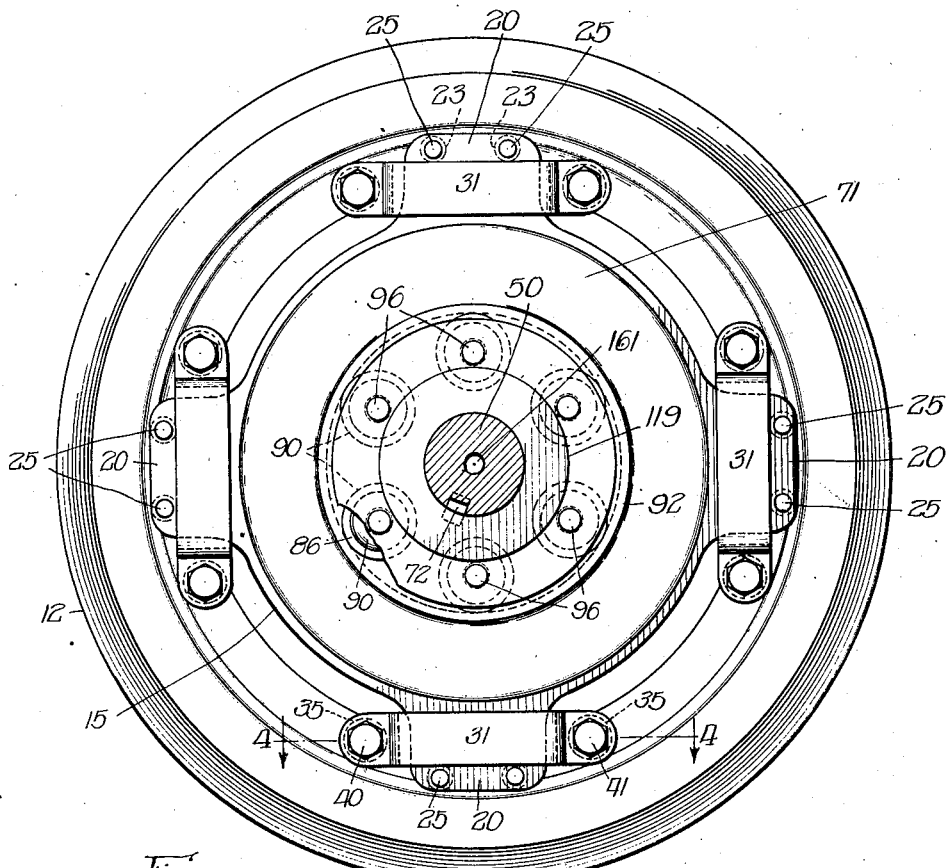
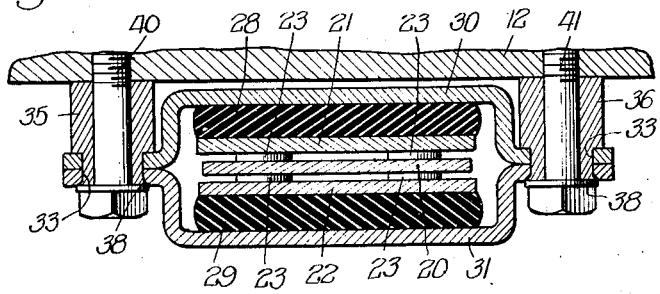
Inventor:
Clarence M. Eason, Patented June 13, 1939

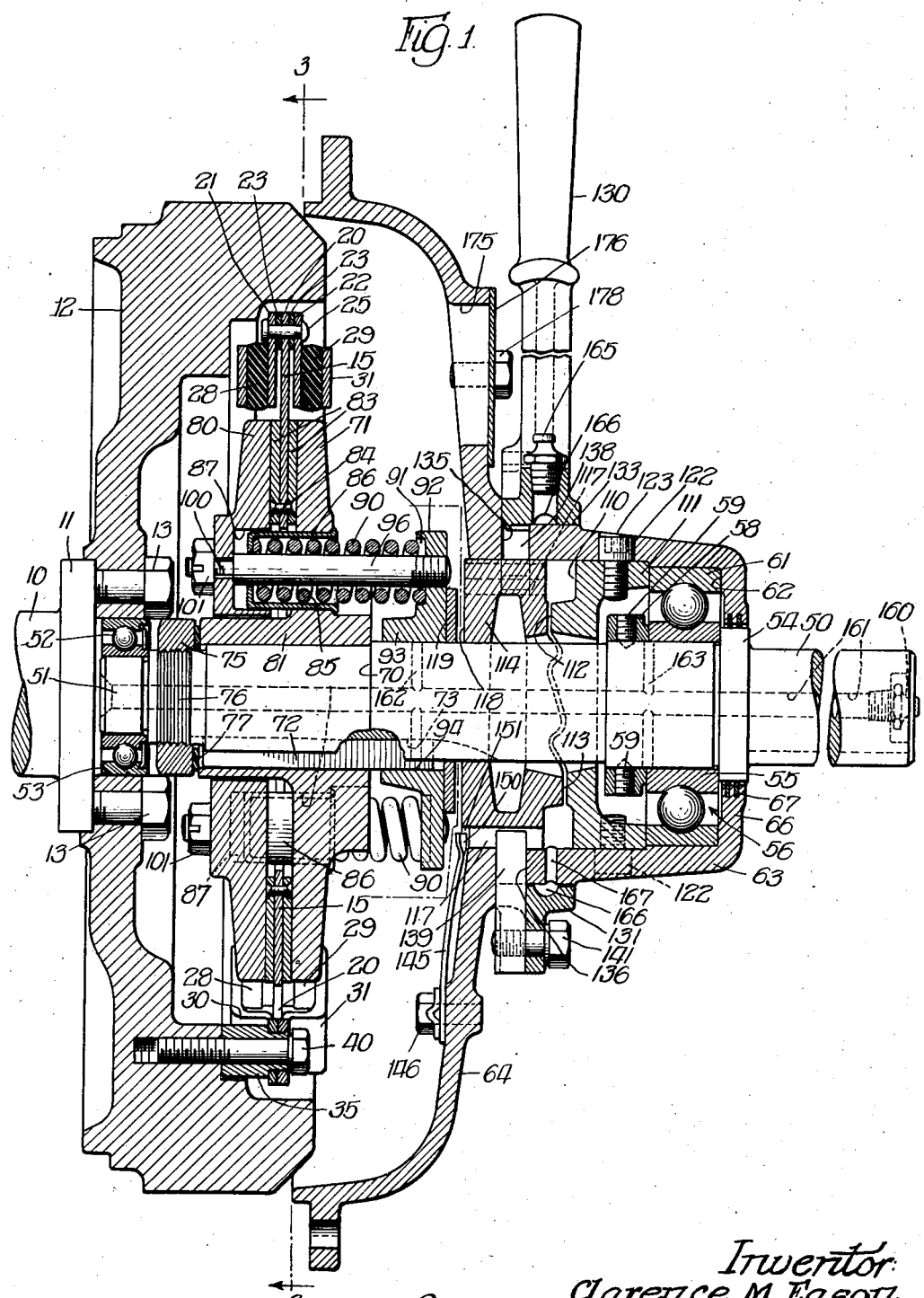

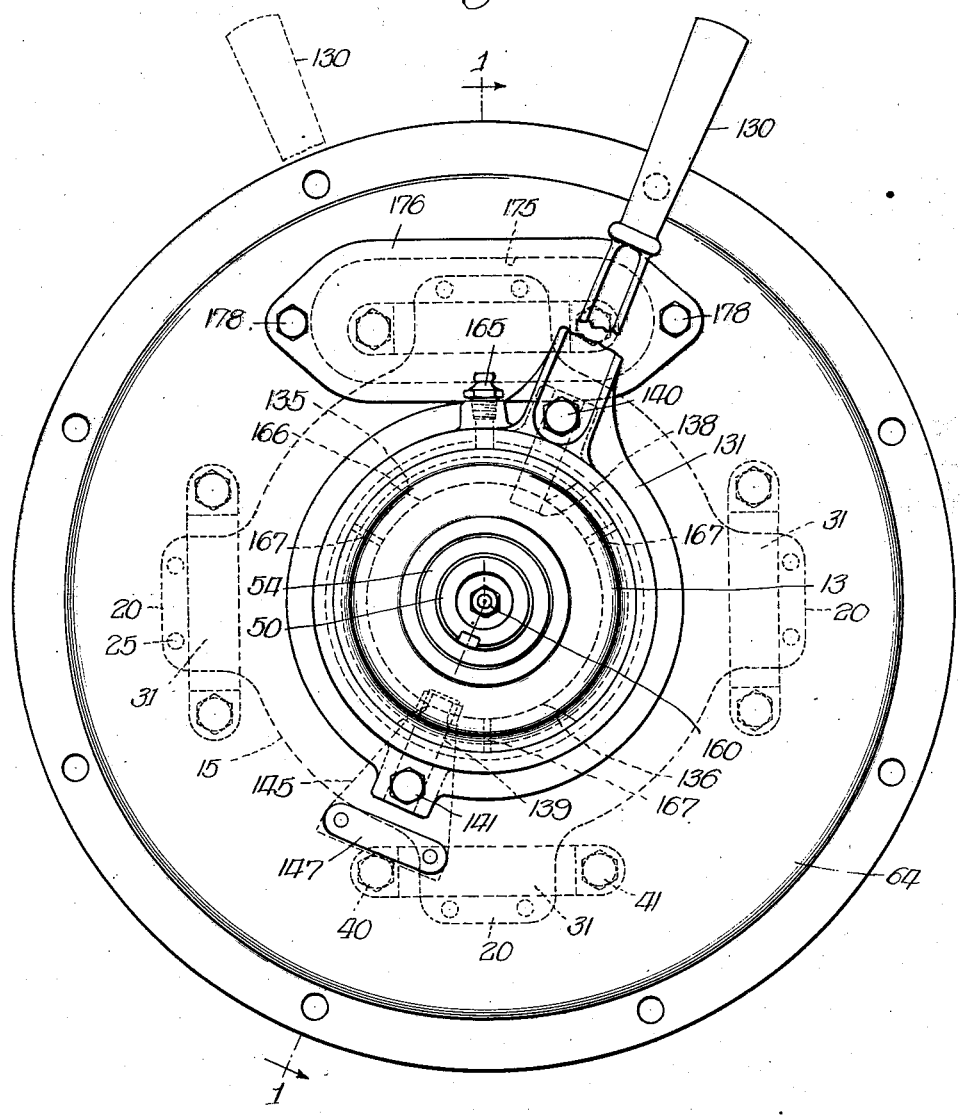

2,162,071

UNITED STATES PATENT OFFICE 2,162,071

CLUTCH

Clarence M. Eason, Waukesha, Wis., assignor to Industrial Clutch Company, a corporation of Wisconsin Application January 15, 1937, Serial No. 120,762

22 Claims. (Cl. 192—68)

The present invention relates generally to clutches and the like for connecting and disconnecting driving and driven elements.

The principal object of the present invention is the provision of a new and improved clutch mechanism having a driving disc flexibly connected with the driving element and a pair of driven discs or plate members which move with the driven shaft.

A further object of the present invention in this connection is the provision of an improved clutch construction in which the clutch unit is readily detachable from the driving element and which, when detached, can be easily disassembled so as to remove and replace the driving disc without disassembling or in any way affecting the position of the biasing springs which normally clamp the two driven clutch plates against the driving clutch disc.

Still another object of the present invention is the provision of improved shifting mechanism for controlling the clutch and in which the bearing means supporting the driven shaft in the clutch housing takes substantially all of the stresses involved when the biasing springs are compressed to release or disengage the clutch, but which is not subjected to any stress from the biasing springs when the clutch is engaged.

These and other objects and advantages of the present invention will be apparent to those skilled in the art after a consideration of the following detailed description of the preferred structural embodiment of the invention that is illustrated in the accompanying drawings.

In the drawings:

Figure 1 is a generally vertical longitudinal section taken substantially along the line 1—1 of Figure 2 and showing the details of a clutch embodying the principles of the present invention;

Figure 2 is an end view of the clutch shown in Figure 1;

Figure 3 is a view taken substantially along the line 3—3 of Figure 1 and looking in the direction of the arrows; and Figure 4 is an enlarged section taken along the line 4—4 of Figure 3 and showing the details of one of the flexible connecting units between the driving clutch plate and the driving element.

Referring now more particularly to Figure 1, the reference numeral 10 indicates a driving part in the form of a crank shaft of an internal combustion engine, which represents any convenient or desired source of power, and the crank shaft 10 is provided with a flange 11 to which a driving element in the form of a flywheel 12 is bolted, as by stud bolts 13. A driving clutch member in the form of a disc or plate 15 is fastened in any suitable manner to the driving element 12, but preferably the attaching means is in the form of flexible rubber bushings. As best shown in Figure 3, the driving clutch plate is provided with a plurality of radially outwardly extending lugs or ears 20, and a pair of plates 21 and 22 are riveted on opposite sides of the lugs 20 with washers 23 of fiber or other suitable heat insulating means disposed between the plates 21 and 22 and the lug 20, as best shown in Figure 1. The rivets are indicated by the reference numeral 25. Rubber blocks 28 and 29 have their inner surfaces vulcanized or otherwise bonded to the outer surfaces of the plates 21 and 22, and bonded to the outer surfaces of the rubber blocks 28 and 29 are oppositely disposed generally U-shaped straps 30 and 31 which have their end portions brought together and apertured, as at 33, to receive the reduced ends of spacing bushings 35 and 36, (Figure 4), the reduced ends of the bushings 35 and 36 being riveted over, as at 38, so as to secure the two strap members 30 and 31 in position with the rubber blocks 28 and 29 initially compressed, as indicated in Figures 1 and 4. The bushings 35 and 36 are tubular, and receive attaching studs 40 and 41 by which the straps 30 and 31, and associated tubular bushings 35 and 36, are detachably connected to the driving element or flywheel 12.

Each of the four flexible connecting units are identical, and hence a further description is believed to be unnecessary. In the transmission of torque from the driving element or flywheel 12 to the driving clutch plate 15, the rubber blocks 28 and 29 are stressed only in shear, and hence every particle of each block is functionally active in transmitting the torque from one driving part to the other. Also, the rubber blocks acting in shear accommodate any misalignment between the axis of the driving element 12 and the axis of the driven shaft. The particular details of the flexible connecting means are substantially the same as certain of the flexible connecting units shown and claimed in my copending application Serial No. 117,809, filed December 28, 1936.

The driven shaft is indicated by the reference numeral 50 and has a forward reduced end 51 journaled for rotation by bearing means 52 in a recessed portion 53 formed in the end of the driving element 10, 12. Preferably, the bearing means 52 is of the form which may be easily inserted in and removed from the recess 53 by moving the driven shaft 50 axially of the crank shaft 10. The rear or outer end of the driven shaft 50 is provided with a radially outwardly extending flange 54 against which the inner race 55 of bearing means 56 is disposed, preferably being held in that position by a clamping collar 58 fastened to the driven shaft 50 by set screws 59 or the like. The outer race of the bearing means 56 is indicated at 61 and is seated against a shoulder 62 formed in the nose or extended portion 63 of a clutch housing 64 which, as best shown in Figure 1, encloses the clutch mechanism. The housing nose section 63 has a radially inwardly disposed flange 66 which forms the shoulder 62 and which carries suitable lubricant sealing means 67 that cooperates with the flange 54 of the driven shaft 50 in retaining lubricant within the housing extension or nose 63. Preferably, the bearing means 56 is of the form that is capable of taking both radially and axially directed loads.

The inner end of the driven shaft 50 is provided with a shouldered section 70 upon which a driven clutch plate member 71 is mounted in fixed position, as by a key 72 disposed in a slot 73 cut in the driven shaft 50, and a nut 75 is screwed onto the threaded end 76 of the shaft 50 and holds the fixed driven clutch plate member 71 up against the shoulder 70. A lock washer 77 serves to prevent the lock nut 75 from loosening.

A shiftable clutch plate member 80 is mounted for axial movement relative to the fixed driven clutch plate member 71 about the hub 81 of the latter. The driving clutch plate member 15 is normally disposed between the driven clutch plate members 71 and 80, and the driving plate 15 carries the usual friction lining 83 riveted thereto as at 84. The fixed driven clutch member 71 is provided with a plurality of openings 85 therein, there being preferably six openings, as best indicated in Figure 3. Each of the openings 85 carries a spring receiving cup member 86 of chrome stainless steel or other material having the requisite strength and low heat conductivity, and the inner portions of the cup members 86 extend axially inwardly and into recesses 87 formed in the shiftable driven clutch plate member 80. The openings or recesses 87 fit snugly about the inner ends of the spring receiving cups 86, whereby the latter serve as dowels or other means for causing the driven clutch members 71 and 80 to rotate together while accommodating the axial shifting movement of the shiftable driven clutch plate member 80.

A spring 90 is seated with its inner end in each of the cups 86, as best indicated in Figure 1, and the outer end of each of the springs 90 is received in a recess 91 formed in the flange of a shift collar or ring 92 which is disposed about the driven shaft 50. The collar 92 has a hub 93 with a slot 94 therein which receives the outer end of the key 72 that fixes the driven clutch plate member 71 to the inner end of the driven shaft 50. The ring or collar 92, however, is capable of axial shifting motion along the driven shaft 50. A plurality of tie rods or studs 96 have their outer ends threaded into the flange of the shift collar 92, there being as many studs 96 as there are recesses 85 and springs 90. As best shown in Figure 1, each stud or tie rod 96 extends axially inwardly through the associated spring 90 and spring receiving cup 86 to the bottom of the aligned recess 87 in the hub portion of the shiftable driven clutch plate 80, and the inner end of each of the studs 96 is reduced and threaded, as at 100, to receive a nut 101 which, when tightened, firmly fastens the inner end of the stud 96 to the shiftable clutch plate member 80.

The inner ends of the several springs 90 react through the cup members 86 against the fixed shaft-carried clutch plate member 71 and act, at their outer ends, against the shift ring 92 to exert a pull on the studs 96 and thereby cause the shiftable clutch plate member 80 to clamp the driving clutch plate 15 between the driven clutch members 71 and 80, serving thereby to transmit the torque from the driving element 10, 12 to the driven element 50.

The clutch is disengaged by exerting an axially inwardly directed force against the shift ring 92 to compress the several springs 90 and to act through the studs 96 to move the shiftable clutch plate member 80 inwardly. The mechanism for releasing the clutch will now be described.

A stationary cam member 110 is disposed within the nose portion 63 of the clutch housing and has a flange section 111 bearing against the outer bearing race 61. The stationary cam 110 is provided with an axially inwardly directed cam surface 112 with which the companion axially outwardly facing cam surface 113 on a rotatable cam member 114 cooperates. The rotatable cam member 114 is disposed about the driven shaft 50, similarly to the stationary cam 110, and is provided with a pair of diametrically opposed lug receiving notches 117 and a shifting face 118 adapted to engage a washer 119 formed of anti-friction material and carried on the outer face of the shift ring 92. The stationary cam member 110 is held within the nose 63 and the clutch housing 64 against rotation by any suitable means, such as a plurality of screws 122 threaded into the member 110 and disposed in slots or openings 123 formed in the nose 63.

An operating handle 130 is provided with an extended circular hub 131 having an internal diameter sufficient to embrace the radially outwardly facing shoulder 133 formed on the nose portion 63 adjacent the clutch housing 64, and this portion of the latter is provided with a pair of diametrically opposed circumferentially extending notches 135 and 136 through which a pair of lugs 138 and 139 extend that are bolted, as at 140 and 141 (Figure 2), to the operating handle 130. The inner ends of the lugs 138 and 139 are disposed in the notches 117 formed in the rotatable cam element 114.

When the handle 130 is rotated in a plane transverse to the axis of rotation of the driven shaft 50, the lugs 117 cause the shiftable cam member 114 to move with the handle 130, and in doing so the cooperating cam surfaces 112 and 113 force the shiftable cam element 114 toward the left, as viewed in Figure 1, applying pressure to the shift ring 92 and moving the shiftable clutch member 80 inwardly out of contact with the driving clutch plate 15 and compressing the springs 90, thereby releasing the clutch. When it is desired to reengage the clutch, the handle 130 is moved back to its original position, which permits the springs 90 to expand and draw the shiftable clutch part 80 up against the driving clutch part 15. In this action, it is desirable to provide means for shifting the movable cam member 114 outwardly, and to this end a flat spring 145 is bolted, as at 146, to a boss section 147 (Figure 2) formed on the clutch housing 64. The inner end of the spring 145 is rounded, as at 150 (Figure 1) and engages in a notch 151 formed in the shiftable member 114 so as to move the latter outwardly along the driven shaft 50 up against the stationary cam member 110 when the hand lever 130 is in its clutch engaged position (Figure 1). The throw of the hand lever 130 is slightly greater than the angular distance between the high and low points of the cam surfaces 112 and 113, so that when the hand lever 130 is moved to its dotted line position in Figure 2, the high points of the members 110 and 114 move slightly past one another, thereby automatically holding the clutch disengaged.

The clutch mechanism and associated bearings are lubricated by means of a lubricant fitting 160 carried at the outer end of the driven shaft 50 and communicating through a bore 161 with the pilot bearing 52 at the inner end of the driven shaft 50. Also, ducts 162 and 163 lead from the lubricant bore 161 to the sliding shift ring 92 and to the bearing 56. Sufficient lubricant passes through these ducts to lubricate the associated parts, and the bearing of the hand lever hub 131 on the outside of the clutch housing nose 63 is lubricated by means of a fitting 165 that communicates with a circumferentially extending bore 166. The nose 63 of the clutch housing 64 is provided with a plurality, preferably three, of lubricant ducts 167 which lead from the circumferentially extending lubricant bore 166 to the space between the cam members 110 and 114. The lubricant that passes through the ducts 167 keeps the cam surfaces 112 and 113 adequately lubricated so as to provide for easy and accurate control of the clutch.

The clutch housing 64 is provided with an opening 175 (Figure 1) normally closed by a plate 176 secured to the housing 64 by removable stud bolts 178. When it is desired to remove the clutch unit from the flywheel 12, the plate 176 is removed, and then it is possible to disconnect the rubber cushioning units, one at a time, by taking out the stud bolts 40 and 41. When all four of the rubber units are disconnected from the flywheel 12, the clutch housing 64 can then be detached from the motor housing, and the entire clutch unit, including the housing 64 and the driven shaft 50, can be lifted away from the engine.

After the clutch unit has been detached, as described above, it is a simple matter to set the same upright, remove the nuts 101 fastening the studs 96 to the driven clutch member 80, and then the driving clutch member 15 can be lifted out and replaced with a new clutch plate or for the purpose of renewing the clutch linings. The expansion of the springs 90 when the nuts 101 are removed is limited by the engagement of the shiftable clutch ring 92 with the cam member 114, the clearances being such that the springs 90 do not carry the studs 96 far enough to prevent the subsequent insertion of another driving clutch plate and the reassembly of the driven clutch member 80 on the ends of the studs 96. By tightening the nuts 101 and drawing the shoulder on the inner end of each of the studs 96 up against the driven clutch plate 80, the clutch unit is then ready to be reassembled by first bolting the clutch housing 64 back into position on the motor block, and then each of the rubber cushioning units can be attached to the flywheel through the opening 175, after which the plate 176 is replaced and the bolts 178 inserted and tightened.

While I have shown and described above the preferred structure embodying the principles of the present invention, it will be understood that my invention is not to be limited to the specific details shown and described above, but that, in fact, widely different means may be employed in the practice of the broader aspects of my invention.

What I claim, therefore, and desire to secure by Letters Patent is:

1. A disc clutch comprising a driven shaft, a driving disc member, a driven disc member disposed on the outside of said driving disc member and fixed to said driven shaft, a movable driven disc member carried adjacent the inner end of said driven shaft and on the inside of said driving disc member, means extending axially of said driven disc members for causing them to rotate together, each of said means having an axially extending opening therein, and means passing through said openings and connected with said inner driven disc member for shifting the latter to engage and disengage the clutch.

2. A spring loaded disc clutch comprising a driven shaft, a driven disc member fixed rigidly to said shaft and carrying spring receiving sockets, a second driven disc member movably mounted relative to said first disc member and disposed inwardly of the latter, springs seated in said sockets and extending outwardly, a shift ring axially movable on said driven shaft and receiving the outer ends of said springs, a driving disc member adapted to be clamped between said driven disc members, and tie rods connected to said shift ring and extending inwardly through said springs and sockets and connected to said movably mounted driven disc member, said springs serving to clamp the driving disc member between said driven disc members.

3. A spring loaded disc clutch adapted to connect a driving and a driven member, comprising a driving disc member, flexible means yieldable in a generally radial direction and serving to connect said driving disc member with the driving member, a driven disc member fixedly secured to the inner end of said driven shaft and having a hub section extending inwardly, a second driven disc member shiftably mounted about the inwardly extended hub section of the first mentioned driven disc member and disposed on the inside of said driving disc member, and means reacting against said fixed driven disc member for causing the other driven disc member to clamp the driving disc member therebetween.

4. A disc clutch comprising, in combination, a driving disc member adapted to be connected with a driving element, a pair of driven disc members disposed on opposite sides of said driving disc member, a driven shaft to which one of said driven disc members is rigidly and fixedly connected, said one driven disc member having apertured spring receiving cups extending axially inwardly beyond the driving disc member, the other driven disc member having recesses receiving the inner ends of said cups, whereby the latter accommodate axial movement of the inner driven disc member but constrain the latter to rotate with said fixed driven disc member, a key for fixedly connecting the last mentioned driven disc member to said driven shaft and extending axially outwardly, a shift ring slidably mounted on said driven shaft and constrained to rotate with the latter by said key, springs carried by said cups and extending outwardly to contact with said shift ring, and tie rods connected to said shift ring and passing through said fixed driven disc member and connected with said other driven disc member, whereby said springs serve to draw the shiftable driven disc member toward the fixed driven disc member to clamp the driving disc member therebetween.

5. A disc clutch comprising, in combination, a driving disc member adapted to be connected with a driving element, a pair of driven disc members disposed on opposite sides of said driving disc member, a driven shaft to which one of said driven disc members is rigidly and fixedly connected, said one driven disc member having apertured spring receiving cups extending axially inwardly beyond the driving disc member, the other driven disc member having recesses receiving the inner ends of said cups, whereby the latter accommodate axial movement of the inner driven disc member but constrain the latter to rotate with said fixed driven disc member, a key for fixedly connecting the last mentioned driven disc member to said driven shaft and extending axially outwardly, a shift ring slidably mounted on said driven shaft and constrained to rotate with the latter by said key, springs carried by said cups and extending outwardly to contact with said shift ring, tie rods connected to said shift ring and passing through said fixed driven disc member and connected with said other driven disc member, whereby said springs serve to draw the shiftable driven disc member toward the fixed driven disc member to clamp the driving disc member therebetween, and means acting against said shift ring for causing the shift ring to compress said springs and to act through said tie rods to move said shiftable driven disc member away from said fixed driven disc member to release the driving disc member disposed therebetween.

6. A spring loaded disc clutch comprising a pair of driven disc members, a driving disc member therebetween, spring means acting against the inner driven disc member and reacting against the outer disc member for clamping the driving disc member therebetween, means for causing said driven disc members to rotate together, comprising a plurality of pins fixed to the inner driven disc member and extending outwardly through openings in the other driven disc member, and shift means engaging the outer ends of said pins for shifting said inner disc member away from the driving disc member.

7. In a disc clutch adapted to connect a driving element to a driven element, the combination of a driving disc having a series of peripherally disposed radially outwardly extending lugs, and means for flexibly connecting said disc to said driving element comprising a pair of plates disposed on opposite sides of each of said lugs, means for fastening each pair of plates to the associated lug, including means having low heat conductivity, a rubber block bonded to the outer side of each of said plates, a second pair of plates bonded to the outer sides of said blocks of rubber, and means for anchoring each of said pairs of outer plates to said driving element for transmitting torque to said driving disc through said rubber blocks and said peripheral disc lugs.

8. A clutch unit comprising a driven shaft, a driven clutch plate fixedly secured to said driven shaft adjacent the inner end thereof, a shiftable clutch plate mounted about the inner end of said driven shaft inwardly of said fixed clutch plate, a driving clutch plate disposed between said driven clutch plates, and means controlling said shiftable clutch plate including parts extending through said fixed clutch plate and releasably connected to said shiftable clutch plate, the detachable connection of said driving clutch plate with said driving element accommodating the removal of the clutch plates and driven shaft as a unit from the driving element and the subsequent removal of said shiftable clutch plate and said driving clutch plate by detaching said control means from said shiftable clutch plate.

9. In a clutch comprising, in combination, a driving element, a driven shaft removably associated with said driving element, a driving clutch plate detachably connected to said driving element, a pair of driven clutch members, one fixed to the inner end of said driven shaft and the other disposed for axial movement on the inside of said fixed clutch member and with said driving clutch plate disposed between said driven clutch members, a plurality of axially directed parts disposed in openings in said fixed clutch member and extending inwardly of the latter, said shiftable clutch member being mounted for movement on said parts toward said fixed clutch member to clamp the driving clutch plate therebetween, means associated with said parts and detachably connected to said shiftable clutch member, and shifting means reacting against the outer portion of said last named means for moving said shiftable clutch member relative to said fixed clutch member.

10. In a disc clutch, the combination of a driving element, a driven shaft detachably associated therewith, a driving clutch plate detachably connected to said driving element, a pair of driven clutch members, one being fixed to the inner portion of said driven shaft, and the other being disposed inwardly thereof and adapted to have axial movement with respect thereto, said driving plate being disposed between said driven clutch members, spring receiving sockets carried by said fixed clutch mmeber, springs seated in said sockets and extending axially outwardly of said fixed clutch member, an axially extending link disposed in each of said sockets and the associated spring, means detachably connecting the inner end of each of said links with said shiftable clutch plate, and shifting means engageable with the outer ends of said links for shifting said inner clutch member against the action of said springs to release the driving clutch plate, said shifting means being arranged to limit the axially outward movement of said links when the driven shaft and associated parts are detached from said driving element and said links are detached from said shiftable clutch member, whereby the latter and said driving clutch plate may be removed from the clutch without disturbing said springs.

11. In a clutch, a housing, a driven shaft, bearing means supporting said shaft for rotation in said housing and including inner and outer bearing races, driving and driven clutch means adapted to connect said shaft to a driving element, spring means for engaging said clutch means, and means including a part engaging the outer bearing race for compressing said spring means to disengage the clutch, said spring means in being compressed reacting through said driven shaft against the other of said bearing races.

12. In a clutch, a housing, a driven shaft, bearing means supporting said shaft for rotation in said housing and including inner and outer bearing races, driving and driven clutch means adapted to connect said shaft to a driving element, means for engaging said clutch means including biasing springs and a shiftable member movable axially along said driven shaft, a stationary cam ring surrounding said driven shaft and engaging the outer bearing race, a shiftable cam ring disposed inwardly of said stationary cam ring and cooperating therewith to engage and move said shiftable member, and means carried by said housing and engaging said shiftable cam ring for moving the latter.

13. In a clutch, a housing, a pair of relatively movable clutch members, means for shifting one of said members relative to the other comprising a pair of cam members having cooperating cam surfaces, one of said cam members being fixed relative to said housing and the other movable with respect thereto, and means mounted exteriorly of said housing for limited movement thereon and operatively connected to said movable cam element, the permissive movement of said exteriorly mounted means being slightly greater than the distance between the high and low points on said cooperating cam surfaces, whereby said cam members in one position of said exteriorly mounted means are moved slightly past a position in which the high point on one cam member engages the high point on the other cam member.

14. A disc clutch comprising a driven shaft, a driving disc member, a driven disc member disposed on the outside of said driving disc member, a movable driven disc member carried adjacent the inner end of said driven shaft and on the inside of said driving disc, means extending axially of said driven disc members for causing them to rotate together, each of said means having an axially extending opening therein, means passing through said openings and detachably connected with said inner driven disc member for shifting the latter to engage and disengage the clutch, and shift mechanism disposed about said driven shaft and engageable with said connecting means for shifting said inner driven disc member, said shift mechanism being engageable by said connecting means to prevent disassembly of the clutch parts when said movable driven disc member is detached from said connecting means.

15. A disc clutch comprising a driven shaft, a driving disc member, a driven disc member disposed on the outside of said driving disc member, a movable driven disc member carried adjacent the inner end of said driven shaft and on the inside of said driving disc, there being openings in the outer driven disc member, means extending through said openings and detachably connected to the inner driven disc member, springs acting between said outer driven disc member and the outer ends of said detachably connected means, and shift mechanism acting through said detachably connected means for shifting the inner driven disc member relative to the outer driven disc member against the action of said springs and acting to limit the expansion of said springs when said detachably connected means is detached from said inner driven disc member.

16. A spring loaded disc clutch comprising a driven shaft, a driven disc member on said shaft, a second driven disc member axially movable relative to said first disc member, one of said members carrying spring receiving sockets, springs having their inner ends seated in said sockets and their outer ends extending outwardly thereof, means including parts fixed to the other disc member and extending axially through said sockets for connecting said outer ends of the springs with said other disc member, a driving disc member adapted to be clamped between said driven disc members, and means operatively connected with said parts for shifting said other disc member relatively to said one disc member, said springs serving to clamp the driving disc member between said driven disc members.

17. A disc clutch comprising, in combination, a driving disc member adapted to be connected with a driving element, a pair of driven disc members disposed on opposite sides of said driving disc member, a driven shaft to which one of said driven disc members is connected, said one driven disc member having apertured spring receiving cups extending axially inwardly beyond the driving disc member, the other driven disc member having recesses receiving the inner ends of said cups, whereby the latter accommodate axial movement of the inner driven disc member but constrain the latter to rotate with said fixed driven disc member, a shift ring slidably mounted on said driven shaft axially outwardly of said one disc member, springs carried by said cups and extending outwardly to contact with said shift ring, and tie rods connected to said shift ring and passing through said first driven disc member and connected with said other driven disc member, whereby said springs serve to draw the shiftable driven disc member toward the other driven disc member to clamp the driving disc member therebetween.

18. In a disc clutch adapted to connect a driving element to a driven element, the combination of a driving disc having a series of peripherally disposed radially outwardly extending lugs, and means for flexibly connecting said disc to said driving element comprising a pair of plates disposed on opposite sides of each of said lugs, means for fastening each pair of plates to the associated lug, including spaced apart washers of low heat conductivity, said washers spacing said plates away from said driving disc to promote the circulation of air between the latter and said plates, a rubber block bonded to the outer side of each of said plates, a second pair of plates bonded to the outer sides of said blocks of rubber, and means for anchoring each of said pairs of outer plates to said driving element for transmitting torque to said driving disc through said rubber blocks and said peripheral disc lugs.

19. In a clutch, a housing, a driven shaft, bearing means supporting said shaft for rotation in said housing and including inner and outer bearing races, driving and driven clutch means adapted to connect said shaft to a driving element, spring means for engaging said clutch means, and means including a part reacting against one of the bearing races for compressing said spring means to disengage the clutch, said spring means in being compressed reacting against the other of said bearing races.

20. In a disc clutch, the combination of a housing, a driving element, a driven shaft detachably associated therewith and journaled in said housing, a driving clutch plate detachably connected to said driving element, a pair of driven clutch members, one being fixed to the inner portion of said driven shaft and the other being disposed inwardly thereof and adapted to have axial movement with respect thereto, said driving plate being disposed between said driven clutch members, spring receiving sockets carried by said fixed clutch member, springs seated in said sockets and extending axially outwardly of said fixed clutch member, an axially extending link disposed in each of said sockets and the associated spring, means detachably connecting the inner end of each of said links with said shiftable clutch plate, and shifting means reacting against said housing and engageable with the outer ends of said links for shifting said inner clutch member against the action of said springs to release the driving clutch plate.

21. A disc clutch comprising a driven shaft, a driving disc member, a driven disc member disposed on the outside of said driving disc member, a movable driven disc member carried adjacent the inner end of said driven shaft and on the inside of said driving disc, means extending axially of said driven disc members for causing them to rotate together, each of said means having an axially extending opening therein, and means passing through said openings and detachably connected with said inner driven disc member for shifting the latter to engage and disengage the clutch.

22. A disc clutch comprising a driven shaft, a driving disc member, a driven disc member disposed on the outside of said driving disc member, a movable driven disc member carried adjacent the inner end of said driven shaft and on the inside of said driving disc member, there being openings in the outer driven disc member, means extending through said openings and detachably connected to the inner driven disc member, biased means acting against the outer ends of said detachably connected means for moving the inner driven disc member against the driving disc member, and means limiting the outward movement of said biased means when said detachably connected means is detached from the inner driven disc member.

CLARENCE M. EASON.